United States Patent [19]

Shimeki et al.

[11] Patent Number: 5,542,005
[45] Date of Patent: Jul. 30, 1996

[54] RECOGNITION UNIT AND RECOGNITION APPARATUS

[75] Inventors: Yasuharu Shimeki, Suita; Susumu Maruno, Osaka; Toshiyuki Kohda, Nara; Shigeo Sakaue, Moriguchi; Hiroshi Yamamoto, Katano; Yoshihiro Kojima, Kobe, all of Japan

[73] Assignee: Matsushita Electric Industrial Co., Ltd., Osaka-fu, Japan

[21] Appl. No.: 403,126

[22] Filed: Mar. 13, 1995

Related U.S. Application Data

[63] Continuation of Ser. No. 947,509, Sep. 17, 1992, abandoned.

[30] Foreign Application Priority Data

Sep. 17, 1991 [JP] Japan ........................ 3-236067

[51] Int. Cl.⁶ ........................................... G06K 9/62
[52] U.S. Cl. .......................... 382/155; 382/158; 395/21; 395/23
[58] Field of Search ........................ 382/155, 158; 395/21, 23

[56] References Cited

U.S. PATENT DOCUMENTS

| | | | |
|---|---|---|---|
| 3,646,329 | 2/1972 | Yoshino et al. | 382/14 |
| 5,040,230 | 8/1991 | Takatori et al. | 382/14 |
| 5,063,601 | 11/1991 | Hayduk | 382/14 |
| 5,086,479 | 2/1992 | Takenaga et al. | 382/14 |
| 5,212,821 | 5/1993 | Gorin et al. | 382/15 |

FOREIGN PATENT DOCUMENTS 4-54685  2/1992  Japan .

OTHER PUBLICATIONS

"Multi–Functional Layered Network Using Quantizer Neurons", Maruno, International Symposium Computer World '90 Nov. 7–9, 1990, Kobe, Japan.
"VLSI Architectures for Associative Networks", Rückert et al., IEEE 1988, pp. 755–758.

Primary Examiner—Leo Boudreau
Assistant Examiner—Chris Kelley
Attorney, Agent, or Firm—Wenderoth, Lind & Ponack

[57] ABSTRACT

A recognition apparatus is provided with a plurality of recognition units organized in a multilayered hierarchical structure. Each of the recognition units includes a signal input section, a quantizer for performing a quantization according to a signal inputted from the signal input section, and a path selecting section for performing a selection of paths according to an output from the quantizer. The path selecting section includes a path input section having at least one path input terminal, a path output section having at least one path output terminal, a load distribution selecting section for selecting a load distribution, and a load setting section for changing the strength of connection between the path input terminal and the path output terminal according to the output of the quantizer by the use of the load distribution selected by the load distribution selecting section.

16 Claims, 9 Drawing Sheets

LEVEL POSITION DETERMINED
BY QUANTIZATION

LEVEL POSITION DETERMINED
BY QUANTIZATION

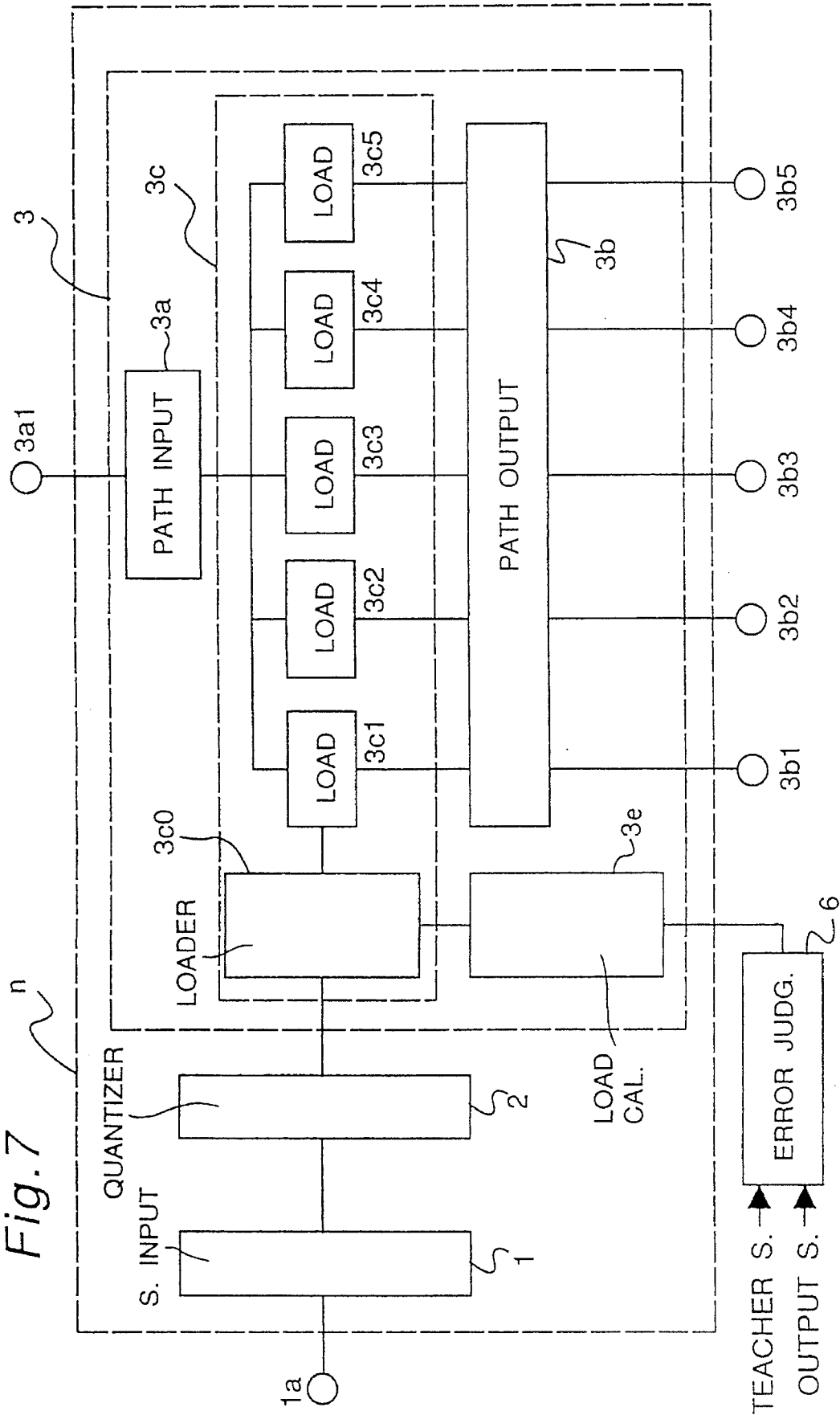

RECOGNITION UNIT AND RECOGNITION APPARATUS

This application is a Continuation of application, Ser. No. 07/947,509, filed Sep. 17, 1992 now abandoned.

BACKGROUND OF THE INVENTION

1. Field of the Invention

The present invention relates to a recognition unit and a recognition apparatus having a plurality of recognition units organized in a multilayered hierarchical structure. The recognition apparatus is preferably utilized as a learning apparatus capable of recognizing an object according to various characteristic data thereof through learning.

2. Description of the Prior Art

A conventional learning apparatus is disclosed, for example, in "Learning Representations by Back-Propagating Errors" written by D. E. Rumelhart, G. E. Hinton, and R. J. Williams and published in "Nature, vol.323, pp.533–536, Oct. 9, 1986". This learning apparatus is schematically shown in FIG. 1.

As shown in FIG. 1, the learning apparatus comprises an output signal calculating section 10 and a weight renewing section 20. The weight renewing section 20 renews the value of weights of the output signal calculating section 10 based on an output signal from the output signal calculating section 10.

The output signal calculating section 10 is organized in a hierarchical structure as shown in FIG. 2. As clearly shown in FIG. 2, the output signal calculating section 10 comprises a plurality of input sections 40 and a plurality of signal processing sections 30. Each of the signal processing sections 30 derives at least one output from a plurality of inputs.

As shown in FIG. 3, the signal processing section 30 comprises a plurality of input sections 50, a memory 60 in which are stored a plurality of weights for weighting inputs from respective input sections 50, a plurality of multipliers 70 each for multiplying an input from each input section 50 by a weight stored in the memory 60, an adder 80 for adding outputs from the multipliers 70, and a threshold processor 90 for limiting an output from the adder 80 to a value falling within a given range.

FIG. 4 is a graph indicating an input/output characteristic function of the threshold processor 90, which is given, for example, by:

$$f(I) = \frac{1}{1 + \exp(-I + \theta)}$$

where I is an input to the threshold processor 90. According to this equation, the output from the threshold processor is limited to a value falling within the range of (0, 1). The input/output characteristic function shown above may be replaced by any other suitable threshold function.

Referring back to FIG. 1, the weight renewing section 20 comprises a teacher signal generating section 100, an error signal calculating section 110, and a weight alteration amount calculating section 120.

The learning apparatus having the above-described construction operates as follows.

When the input sections 40 of the output signal calculating section 10 receive respective input signals, the multipliers 70 of each signal processing section 30 multiply outputs from the signal processing sections 30 connected therewith and located at a lower layer than the layer thereof by respective weights stored in the memory 60. The weights or loads are indicative of the strength in the connection between two signal processing sections 30. The sum of outputs from the multipliers 70 is calculated by the adder 80 and is converted by the threshold processor 90. Thereafter, the resultant value is outputted to one or more signal processing sections 30 located at the next upper layer.

More specifically, each of the signal processing sections 30 performs an operation given by:

$$o_i = f(\Sigma_j w_{ij} o_j)$$

where $o_j$ is a value inputted to the input section 50 (an output from a $j^{th}$ signal processing section 30 at the lower layer), $w_{ij}$ is a weight stored in the memory 60 (a weight in the connection between an $i^{th}$ signal processing section 30 and the $j^{th}$ signal processing section 30 at the lower layer), and $\Sigma$ is the sum of all the weights connected with the $i^{th}$ signal processing section 30.

According to signals inputted to the output signal calculating section 10 via the input sections 40 thereof, the teacher signal generating section 100 generates, as a teacher signal $t_i$ ("0" or "1"), an appropriate output signal. Thereafter, the error signal calculating section 110 calculates a difference $(t_i - o_i)$ between the teacher signal and the signal $o_i$ actually outputted from the output signal calculating section 10. This difference is outputted to the weight alteration amount calculating section 120, which calculates a square error in the signal processing sections 30 at the uppermost layer from the difference $(t_i - o_i)$. The square error is given by:

$$E = 0.5 \Sigma_i (t_i - o_i)^2$$

Based on the square error E, the weight alteration amount calculating section 120 calculates the amount of alteration of the weights stored in the memory 60 of the output signal calculating section 10 using an equation given by:

$$\Delta w_{ij} = -\epsilon * \partial E / \partial w_{ij} + \alpha * \Delta w'_{ij}$$

where $\Sigma_i$ is the sum associated with all the signal processing sections 30 at the uppermost layer in the output signal calculating section 10, $\epsilon$ is a positive constant called the "learning rate", $\alpha$ is a positive constant called an "acceleration parameter", and $\Delta w'_{ij}$ is the amount of alteration of the weights in the previous learning. In this way, the weights are altered.

The error can be made small by repeating the renewal of the weights. When the error becomes considerably small to the extent that the output signal is regarded as being satisfactorily close to a desired value, the learning is terminated. At this stage, the learning apparatus can recognize input characteristic data and can output a recognition result.

The learning apparatus having the above-described construction, however, must determine all the weights through a learning from a completely random state. Furthermore, upon completion of the learning, when the learning apparatus is required to learn a recognition operation so as to provide a desired output in response to unknown input data, a problem arises in that a time-consuming new learning is needed using previously learned data.

SUMMARY OF THE INVENTION

The present invention has been developed to overcome the above-described disadvantages.

It is accordingly an object of the present invention to provide an improved recognition unit and an improved recognition apparatus capable of performing a high-speed learning to provide a desired output in response to unknown input data.

Another object of the present invention is to provide a recognition apparatus of the above-described type capable of facilitating the alteration of weights in the connection between two signal processors.

In accomplishing the above and other objects, a recognition unit according to the present invention comprises a signal input section, a quantizer for performing a quantization according to a signal inputted from the signal input section, and a path selecting section for performing a selection of paths according to an output from the quantizer. The path selecting section comprises a path input section having at least one path input terminal, a path output section having at least one path output terminal, a load distribution selecting section for selecting a load distribution, and a load setting section for changing the strength of connection between the path input terminal and the path output terminal according to the output of the quantizer by the use of the load distribution selected by the load distribution selecting section.

Alternatively, the load distribution selecting section may be replaced by a load calculating section for calculating a load distribution according to the amount of error between a teacher signal and an output from a network having a plurality of recognition units organized in a multi-layered hierarchical structure. In this case, the load setting section changes the strength of connection between the path input terminal and the path output terminal according to the output of the quantizer by the use of an output from the load calculating section.

A recognition apparatus having a network organized in a multilayered hierarchical structure can be made by connecting a plurality of recognition units to one another.

Preferably, each of the recognition units positioned at an output layer comprises a path input section having a plurality of path input terminals and an adder for adding signals inputted thereto via the path input terminals, and a path output section having at least one path output terminal and a threshold processor for performing a threshold processing with respect to an output signal from the adder.

Advantageously, the recognition apparatus further comprises an operation mode judging section for judging as to whether the selected mode is an initial learning mode or an additional learning mode, wherein the load distribution selecting section is controlled by the operation mode judging section. Alternatively, the operation mode judging section may judge as to whether the selected mode is a learning mode or a recognition mode. The operation mode judging section may be replaced by a learning progress judgment section for judging the learning progress.

Conveniently, the recognition apparatus is provided with both the operation mode judging section and the learning progress judgment section.

According to the present invention, the connection between the recognition units is determined by the use of a given load distribution, and the load distribution is appropriately selected while the state of learning is being checked. Because it is not necessary to perform the learning from the beginning, not only the time required for the learning to provide a desired output from unknown input data can be reduced, but also the alteration of the loads can be facilitated. In addition, the alteration of the load distribution in the learning operation and in the recognition operation can enhance the accuracy in recognition.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein:

FIG. 7 is a block diagram of a second recognition unit according to the present invention;

DETAILED DESCRIPTION OF THE PREFERRED EMBODIMENTS

The term "quantize" as employed throughout this application is defined as "to map input data into discrete values".

Figure 1:
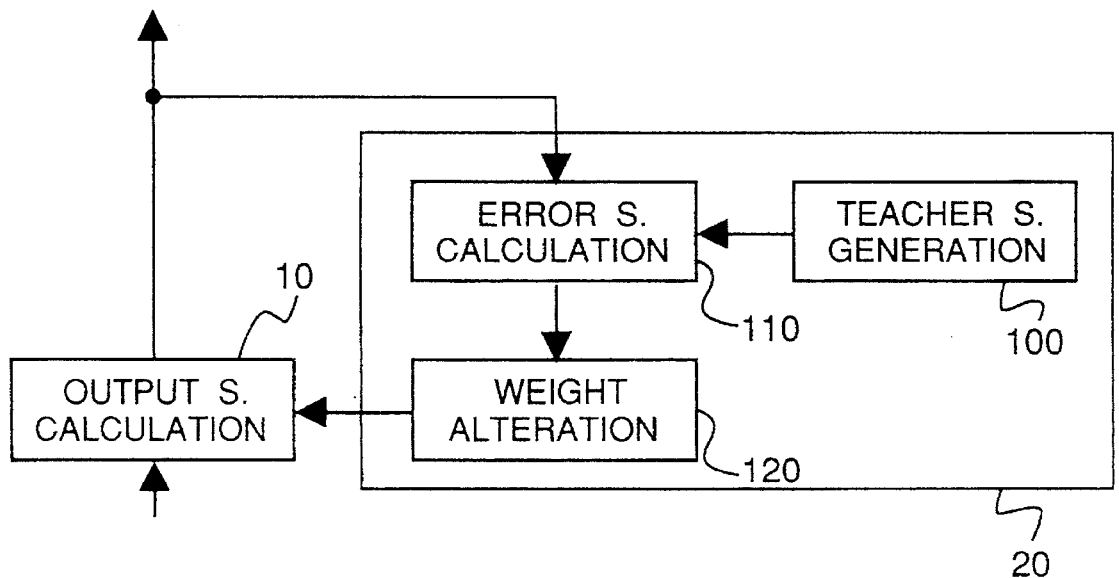
FIG. 1 is a schematic block diagram of a conventional recognition apparatus.
Figure 2:
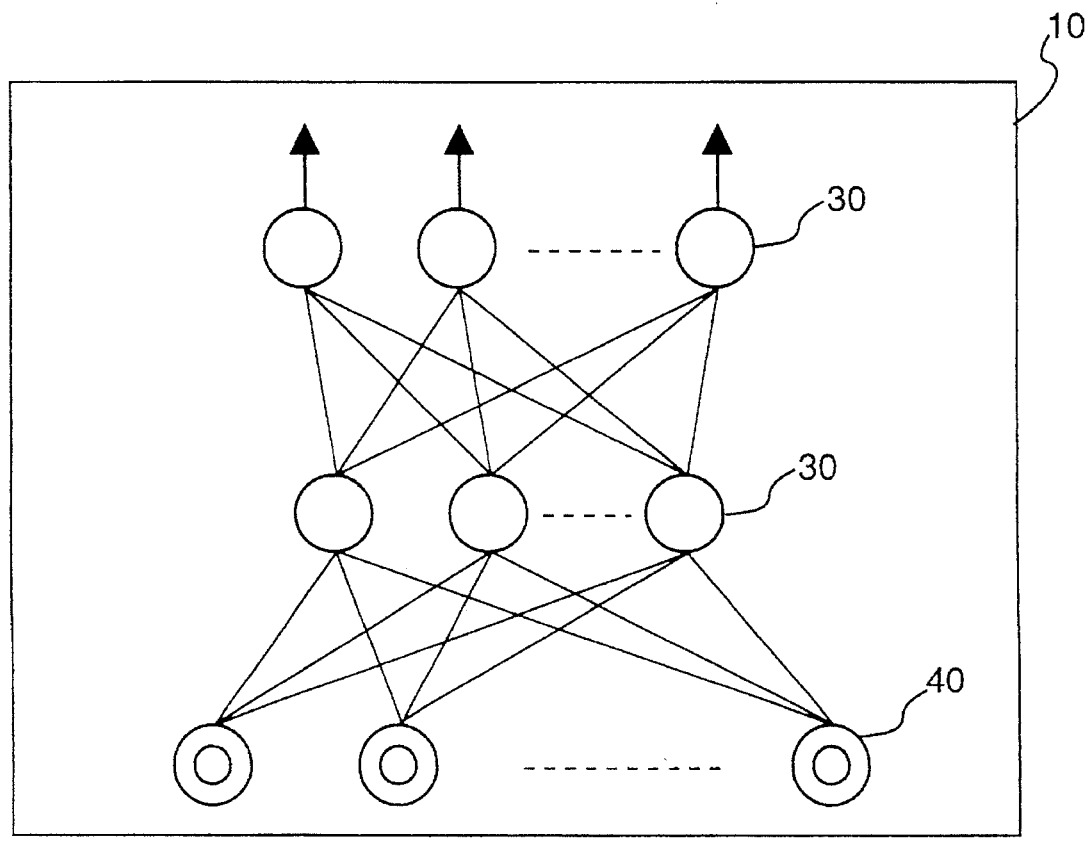
FIG. 2 is a schematic view of an output signal calculating section of the apparatus of FIG. 1.
Figure 3:
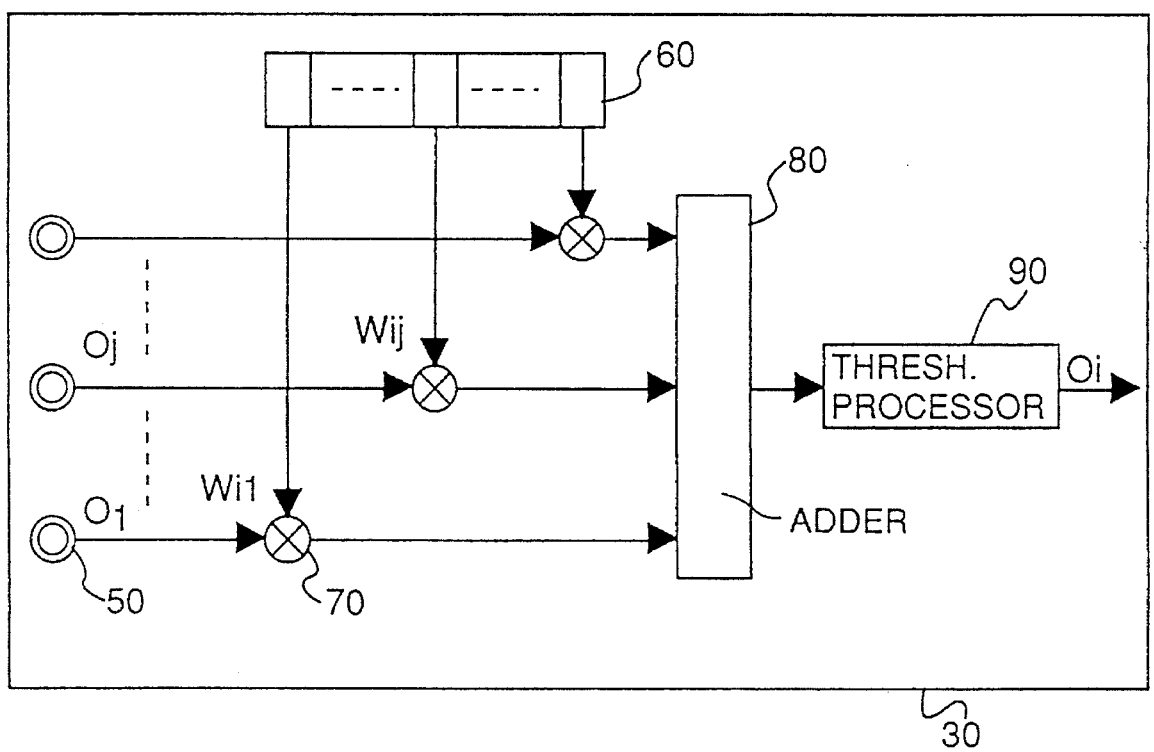
FIG. 3 is a schematic block diagram of a signal processing section of the apparatus of FIG. 1.
Figure 4:
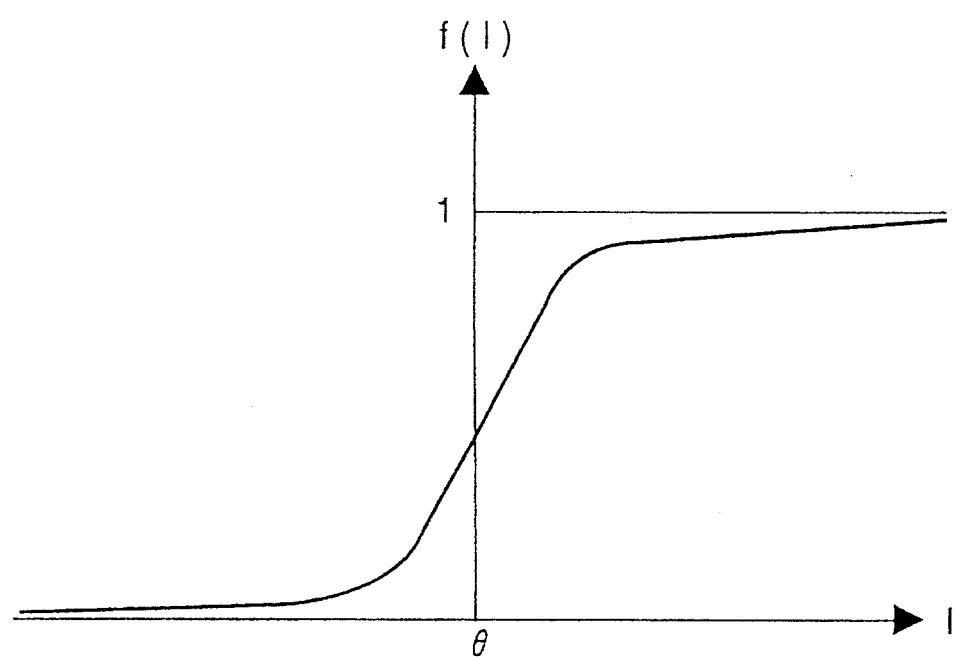
FIG. 4 is a graph indicating a characteristic function of a threshold processor of the apparatus of FIG. 1.
Figure 5:
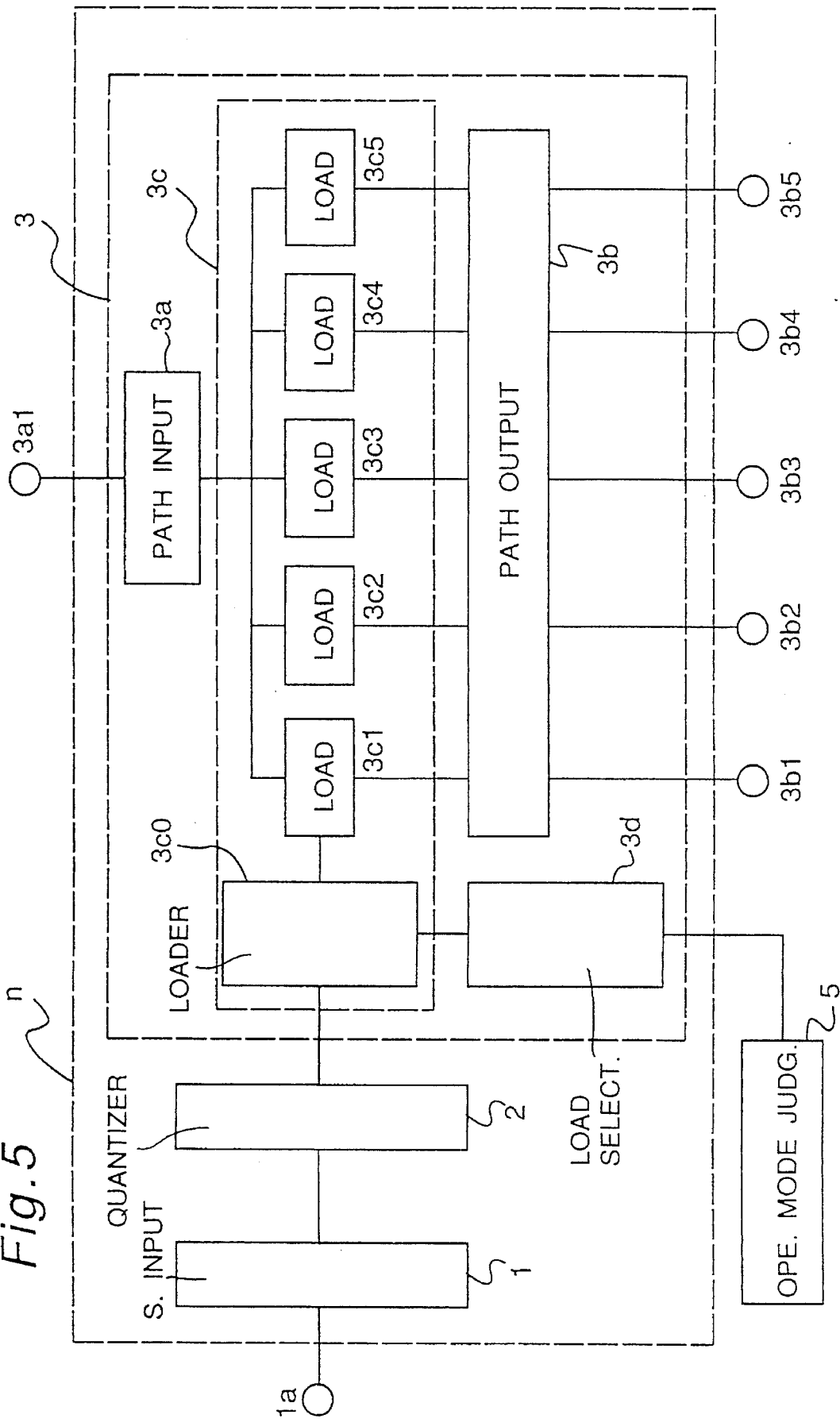
FIG. 5 is a block diagram of a first recognition unit according to the present invention.

Referring now to the drawings, there is shown in FIG. 5 a first recognition unit according to the present invention. The first recognition unit comprises a signal input section 1 to which are inputted characteristic data to be recognized via a signal input terminal $1a$, a quantizer 2 for quantizing the inputted characteristic data, and a path selecting section 3 into which is inputted a value indicative of the quantized level of the characteristic data. The path selecting section 3 comprises a path input terminal $3a1$, a plurality of path output terminals $3b1$–$3b5$, a path input section $3a$, a path output section $3b$, a plurality of loads $3c1$–$3c5$ for connecting the path input section $3a$ and the path output section $3b$, a load distribution selecting section $3d$ for selecting a load distribution, and a load setting section $3c0$ for setting the load distribution selected by the load distribution selecting section $3d$ to the loads $3c1$–$3c5$.

When a plurality of recognition units are organized into a network having a multilayered hierarchical structure, one recognition unit is connected at its path input terminal $3a1$ with one of the path output terminals $3b1$–$3b5$ of the other. The path selection section 3 selects a path corresponding to the value inputted thereto from the quantizer 2, and sets to this selected path a load value positioned at the center of a load distribution which has been selected in advance by the load distribution selecting section $3d$. On respective sides of the selected path, load values determined in accordance with the selected load distribution are set to the loads $3c1$–$3c5$ by the load setting section $3c0$. At this moment, the loads are distributed, centered at a load corresponding to the value inputted from the quantizer 2.

The recognition unit having the above-described construction is connected with an operation mode judging section 5, which judges as to whether the learning in progress is an initial learning or an additional learning and outputs the result to the load distribution selecting section 3d. Alternatively, the operation mode judging section may judge as to whether the selected mode is a learning mode or a recognition mode. The load distribution selecting section 3d selects an appropriate load distribution in accordance with the result outputted from the operation mode judging section 5.

FIGS. 6a to 6e depict some examples of the load distribution to be selected by the load distribution selecting section 3d. As shown in these figures, each load distribution takes a specific value either at the level position determined by the quantization or in a limited range centered at this level position. As the loads depart from the level position determined by the quantization or said limited range, the load distribution reduces from said specific value.

FIG. 7 depicts a second recognition unit according to the present invention. The second recognition unit differs from the first recognition unit shown in FIG. 5 in that the former is provided with a load calculating section 3e in place of the load distribution selecting section 3d provided in the latter. In the path selecting section 3, the load setting section 3c0 sets a load distribution calculated by the load calculating section 3e to the loads 3c1–3c5 based on a value inputted from the quantizer 2.

The second recognition unit is connected with an error judging section 6, which calculates and judges the amount of error between an output from the network and a teacher signal indicative of a desired output. Based on the result of the error judging section 6, the load calculating section 3e calculates the amount of alteration in load distribution, thereby calculating the load distribution.

Figure 8:
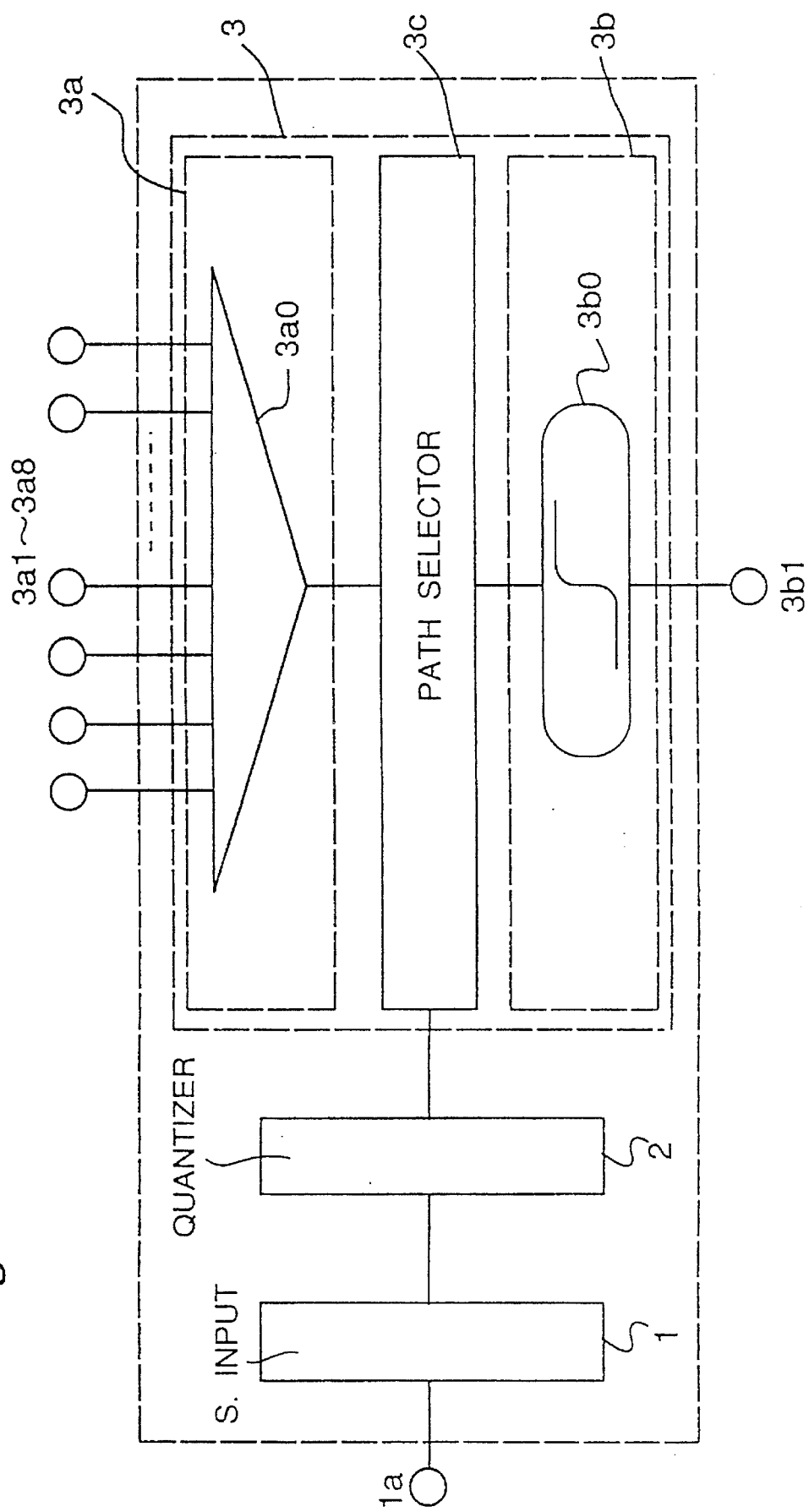
FIG. 8 is a block diagram of a third recognition unit according to the present invention, which is used at an output layer in a network having a multilayered hierarchical structure.

FIG. 8 depicts a third recognition unit according to the present invention, which is utilized as a recognition unit at an output layer of a network having a plurality of first or second recognition units organized in a multilayered hierarchical structure. In the third recognition unit, a path input section 3a comprises an adder 3a0 for adding input signals from a plurality of path input terminals 3a1–3a8 whereas a path output section 3b comprises a threshold processor 3b0 for performing a threshold processing with respect to a path signal. The adder 3a0 adds path signals inputted from the path input terminals 3a1–3a8 and outputs the result of addition to a path selector 3c. A value of "0" or "1" inputted from the signal input terminal 1a is quantized into one of two levels ("0" or "1") by the quantizer 2. In the case of "1", the path selector 3c inputs an output from the adder 3a0 to the threshold processor 3b0. In the case of "0", the path selector 3c does not input the output from the adder 3a0 to the threshold processor 3b0.

Figure 9:
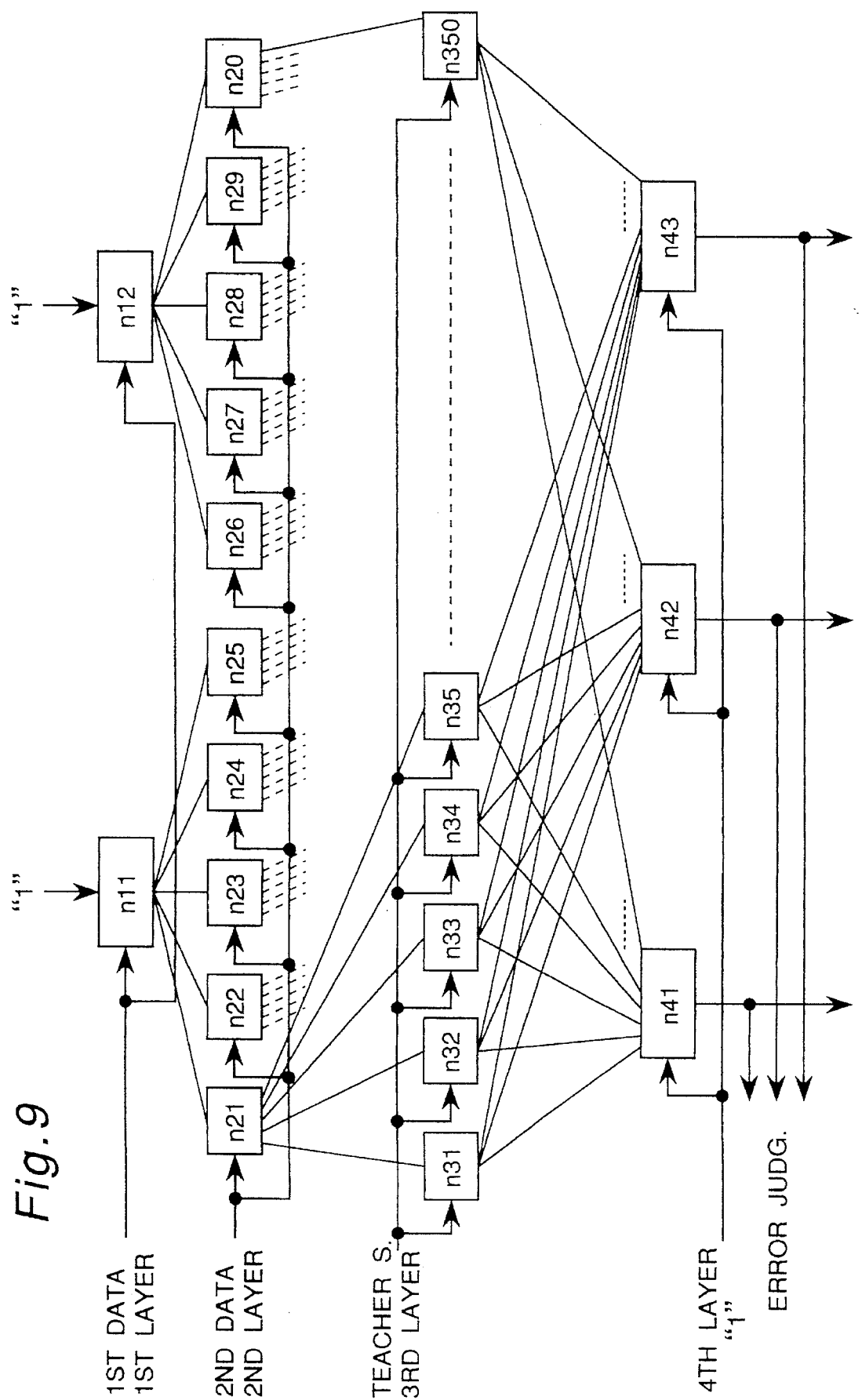
FIG. 9 is a schematic block diagram of a recognition apparatus according the present invention.

FIG. 9 schematically depicts a recognition apparatus according to the present invention, in which a network is organized by appropriately connecting a plurality of recognition units in a multi-layered hierarchical structure. All the recognition units form two branched tree structures each having four layers. The recognition apparatus of FIG. 9 classifies objects to be recognized into three categories based on two kinds of characteristic data (first characteristic data and second characteristic data) obtained each of the objects to be recognized. Each of the first and second characteristic data is made up of two different data obtained from separate portions of each object. The characteristic data to be judged are inputted into the signal input terminals 1a of the recognition units positioned at the first and second layers.

The first recognition unit as shown in FIG. 5 is preferably used as one of recognition units n11, n12 and n20–n29 constituting the first and second layers. The second recognition unit as shown in FIG. 7 is preferably used as one of recognition units n31–n350 constituting the third layer. The recognition unit as shown in FIG. 8 is preferably used as one of recognition units n41–n43 constituting the fourth layer.

The learning operation of the recognition apparatus shown in FIG. 9 is as follows.

At the time of initial learning, the operation mode judging section 5 sends a control signal to the load distribution selecting section 3d to select any one of the load distributions of FIGS. 6a, 6b, 6d and 6e. In the path selector 3c, the load setting section 3c0 sets the loads in accordance with the selected load distribution. Thereafter, "1" is given, as a path signal, to each of the path input terminals 3a1 of the recognition units n11 and n12 positioned at the first layer. Furthermore, a series of first characteristic data of an object to be recognized are inputted to the signal input terminals 1a leading to the quantizers 2 of the recognition units n11 and n12 (in the case of FIG. 9, two first characteristic data are inputted to the two recognition units n11 and n12, respectively). These first characteristic data are quantized by the quantizers 2 of the recognition units n11 and n12, respectively. Based on respective values quantized, the associated load setting section 3c0 sets the loads 3c1–3c5 in accordance with the selected load distribution, wherein the loads 3c1–3c5 are centered at the level position for quantization.

Figure 6A:
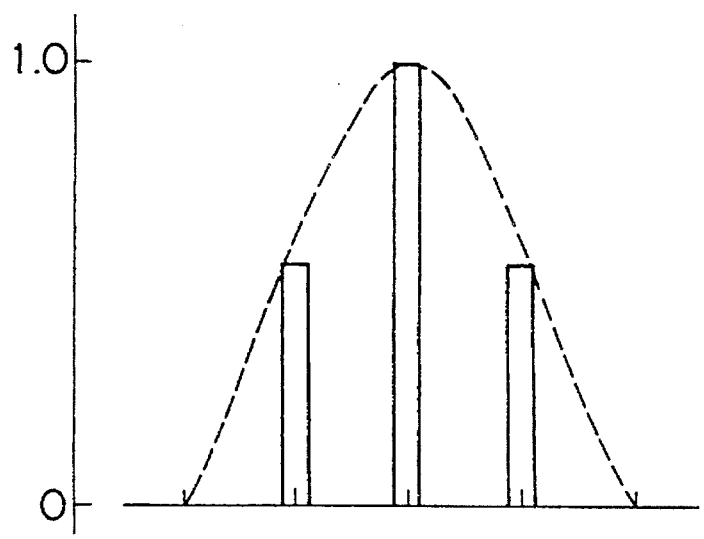
FIGS. 6a to 6e are graphs each indicating a load distribution.
Figure 6B:
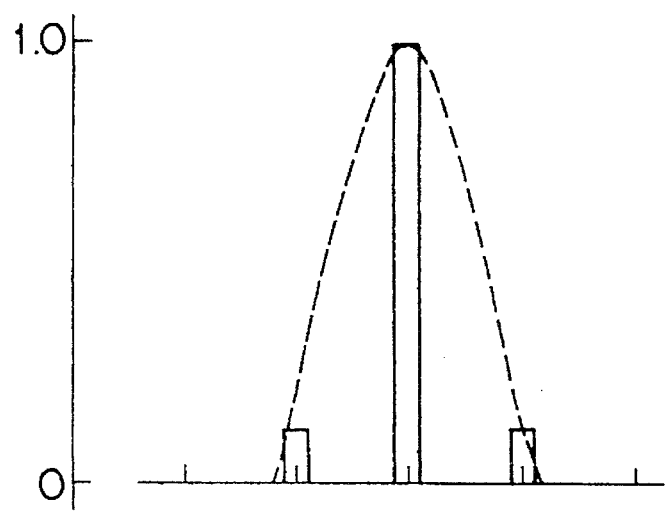
Figure 6C:
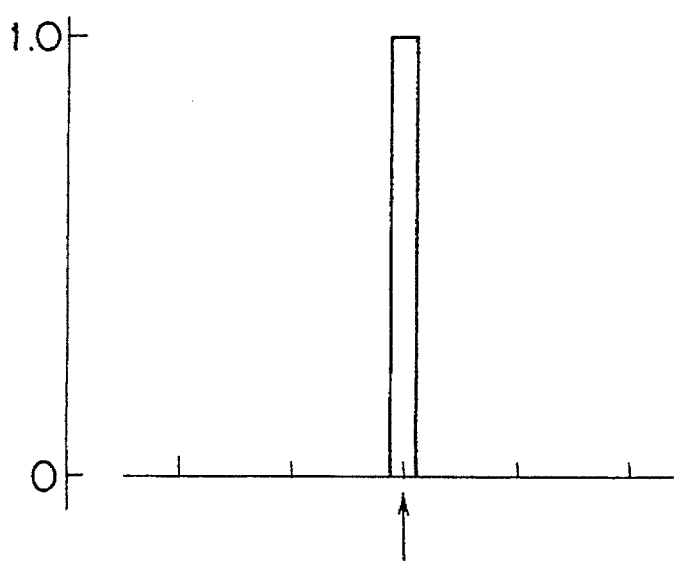
Figure 6D:
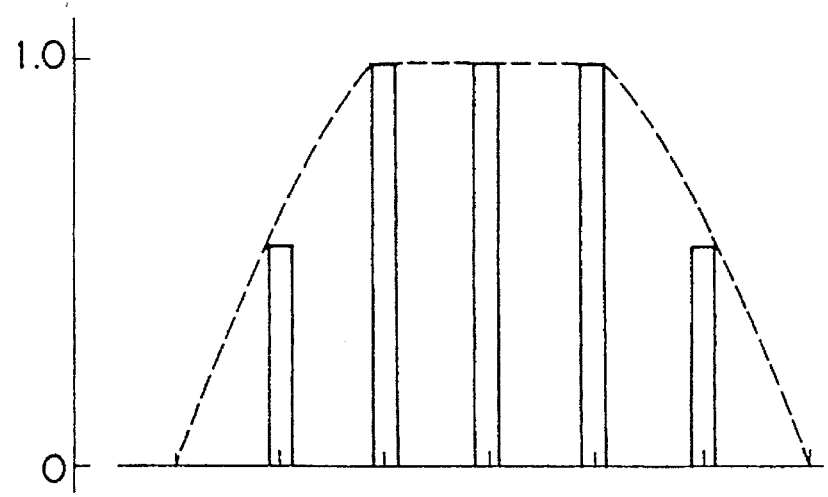
Figure 6E:
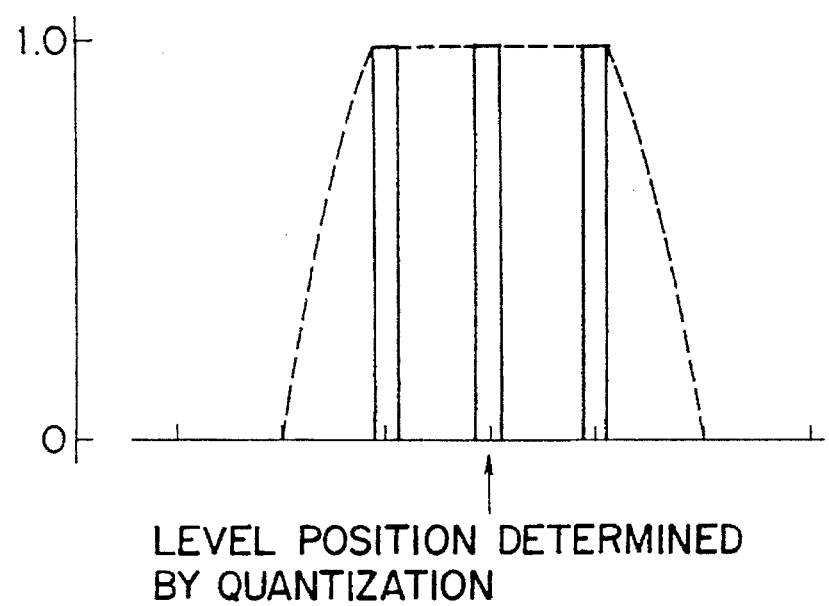

In this embodiment, if the load distribution of FIG. 6d or 6e is selected, the loads of some paths including a path corresponding to the level position for quantization are set to "1" and those of other some paths on respective sides of said some paths are set to respective values less than "1" and greater than "0". The loads of other paths remote from said some paths are all set to "0". If the load distribution of FIG. 6a or 6b is selected, the load of the path corresponding to the level position for quantization is set to "1", and the loads of some paths on respective sides of said path is set to respective values less than "1" and greater than "0". The loads of other paths remote from said path are all set to "0". In this way, a plurality of paths are determined with respective loads. As a result, a value obtained by multiplying the path signal by the associated load is sent to each of the path input termninals 3a1 of the recognition units n20–n29 positioned at the second layer.

To the signal input terminals 1a leading to the quantizers 2 of these recognition units n20–n29 are inputted a series of second characteristic data of the object to be recognized (in the case of FIG. 9, oen of two second characteristic data is inputted to each of the recognition units n21–n25, whereas the other second characteristic data is inputted to each of the recognition units n26 to n20). These second characteristic data are quantized by the quantizers 2 of the recognition units n20–n29. Based on respective values quantized, a plurality of paths are determined with respective loads, as is the case with the first layer.

As a result, a value obtained by multiplying the path signal by the associated load is sent to each of the path input terminals 3a1 of the recognition units n31–n350 positioned at the third layer. To each of the signal input terminals 1a leading to the quantizers 2 of these recognition units n31–n350 is inputted, as an error judgment signal, a teacher signal indicative of which one of the three categories the object to be recognized belongs to i.e., a signal indicative of which one of three recognition units n41–n43 provides the greatest output. For example, when the recognition unit n41 is to provide the greatest output, a signal whereby the value of the level quantized is rendered to be a value corresponding to a path leading to the recognition unit n41 is inputted to each of the signal input terminals 1a of the recognition units n31–n350. In each of the recognition units n41–n43 positioned at the fourth layer, the adder 3a0 of the path input section 3a adds the path signals inputted thereto. Thereafter, "1" is inputted to the signal input terminal 1a of the signal input section 1 and is quantized by the quantizer 2 so that the path output may be enabled by the path selector 3c (when a signal "0" is inputted, the path selector 3c is switched so as not to provide any path output). A signal resulting from the addition is sent to the path output section 3b, which subsequently performs a threshold processing with respect thereto and outputs via the path output terminal 3b1 thereof. Sigmoid function, Step function or the like can be used as a function for performing the threshold processing.

As a result, the error judging section 6 judges as to whether the recognition unit n41 provides the greatest output. If the recognition unit n41 provides the greatest output, the loads of the recognition units connected with the recognition unit n41 are not altered. If not, the load calculating section 3e calculates new load values by adding a predetermined value to each of the current load values, and the load setting section 3c0 sets the new load values to the loads of respective paths.

As a method of calculating the new load values, an addition is performed with respect to values obtained by multiplying any one of the load distributions shown in FIGS. 6a, 6b, 6d and 6e by a predetermined value. Each of these load distributions is centered at the level position for quantization which is indicative of the path designated by the teacher signal. Alternatively, an addition may be performed with respect to values obtained by multiplying any one of the load distributions by values proportional to the difference between the teacher signal obtained in the error judging section 6 and a network output signal. The alteration of the loads is repeatedly performed while input data to be judged are being given, until the network output coincide with the teacher signal.

As described above, in the learning process of the recognition apparatus according to the present invention, the load distribution for connection between the recognition units positioned at two adjoining layers are appropriately switched according to the outputs of the quantizers of the recognition units organized in a multilayered hierarchical network having the branched tree structures. At the layer adjacent to the output layer, an identical teacher signal is inputted to the signal input terminals to enable the associated quantizers to provide outputs so that the path selectors can select the paths connected to that recognition unit of the output layer which should provide the greatest output. In this case, it is sufficient if only paths are altered which fall within the range in which the loads are distributed with the selected path being employed as the position of the level quantized (for example, the non-zero range in any one of the load distributions of FIGS. 6a–6e). Because the loads of all of the paths are, therefore, not necessarily required to be altered, flexible learning can be performed at a very high speed.

It is to be noted that any load distribution other than the load distributions shown in FIGS. 6a–6e is employable if the load of a path corresponding to the level position for quantization is greater than any other loads, which reduce as they depart from said position.

The recognition operation is hereinafter discussed.

The operation mode judging section 5 initially sends a control signal to the load distribution selecting section 3d to select the load distribution of FIG. 6c or any other suitable load distribution having a narrower spread than that of the load distribution employed in the learning. In the path selector 3c, the load setting section 3c0 sets the loads in accordance with the selected load distribution. If the load distribution of FIG. 6c is selected, a single path is selected by the path selector 3c. Even in other cases, a reduced number of paths are selected, as compared with the number of paths selected at the time of the learning. As is the case with the learning operation, "1" is given, as a path signal, to the path input terminal 3a1 of each of the recognition units n11 and n12 positioned at the first layer. Furthermore, the series of first characteristic data of the object to be recognized are inputted to the signal input terminals 1a leading to the quantizers 2 of the recognition units n11 and n12 (in the case of FIG. 9, the two first characteristic data are inputted to the two recognition units n11 and n12, respectively). These first characteristic data are quantized by the quantizers 2 of the recognition units n11 and n12, respectively. Based on respective values quantized, the associated load setting section 3c0 sets the loads 3c1–3c5 in accordance with the selected load distribution, wherein the loads 3c1–3c5 are centered at the level position for quantization. In the case of the load distribution of FIG. 6c, because the load of a path corresponding to the level position for quantization is rendered to be "1" and the loads of other paths are rendered to be "0", a single path is selected with the load thereof. Thereafter, values obtained by multiplying path signals by the loads are sent to the path input terminals 3a1 of the recognition units n20–n29 positioned at the second layer. In the case of a load distribution other than that of FIG. 6c, the load of the path corresponding to the level position for quantization is rendered to be "1", and the loads of other paths are determined in accordance with the selected load distribution. Thereafter, the values obtained by multiplying the path signals by the loads are sent to the path input terminals 3a1 of the recognition units n20–n29 positioned at the second layer. In this case, the path signals are transmitted in a range narrower than the range in which the path signals are transmitted in the learning.

To the signal input terminals 1a leading to the quantizers 2 of these recognition units n20–n29 are inputted the series of second characteristic data of the object to be recognized (in the case of FIG. 9, the two second characteristic data are inputted to five recognition units n21–n25 and to other five recognition units n26–n20, respectively). These second characteristic data are quantized by the quantizers 2 of the recognition units n20–n29. Based on respective values quantized, a plurality of paths, though the range is narrower than that at the time of the learning, are selected with the loads thereof, as is the case with the first layer.

As a result, values obtained by multiplying the path signals by the loads are sent to the path input terminals 3a1 of the recognition units n31–n350 positioned at the third layer. In the case of the recognition operation, no error judgment signals are inputted to the path input terminals 3a1 of the recognition units n31–n350. Accordingly, the state of the loads at the time of the learning is maintained, and the path signals obtained by multiplying the path input signals by these loads are sent to the path input terminals 3a1 of all the recognition units positioned at the fourth layer. The adder 3a0 of the recognition unit at the fourth layer adds the path signals inputted thereto. Thereafter, "1" is inputted to the signal input terminal 1a of the signal input section 1 and is quantized by the quantizer 2 so that the path output may be enabled by the path selector 3c (when a signal "0" is inputted, the path selector 3c is switched so as not to provide any path output). A signal obtained as a result of the addition is sent to the path output section 3b. As discussed hereinabove, because the distribution of the paths selected in the recognition units at the first and second layers is narrower than that selected at the time of the learning, the path signals to be added are indicative of more definite paths, thereby enhancing the accuracy in recognition. The path output section 3b subsequently performs a threshold processing with respect to a signal obtained by the addition and outputs via the path output terminal 3b1 thereof. As is the case with the learning operation, Sigmoid function, Step function or the like can also be used as a function for performing the threshold processing. Accordingly, if the value of the signal obtained by the addition exceeds a threshold value, this signal is outputted via the path output terminal 3b1. Based on the input characteristic data of the object to be recognized, the recognition apparatus can recognize and classify the object with accuracy.

As described hereinabove, while a load distribution is imparted to each of the recognition units at the first and second layers during learning, the loads of each of the recognition units at the third layer are determined. Accordingly, even if the input characteristic data vary, the recognition apparatus can provide a correct output.

It is to be noted that because the recognition operation does not change even if any one of the load distributions shown in FIGS. 6a–6e is employed, the load distribution applicable to the present invention is not limited thereby. It is, however, preferable to employ a load distribution having a narrower spread than that of the load distribution employed in the learning.

An additional learning is discussed hereinafter.

The learning is performed so as to provide a desired output by finding the amount of alteration of the loads, as is the case with the initial learning. The additional learning is substantially the same as the initial learning except that, in the additional learning, the loads are set to the path selecting section upon selection of a load distribution narrower than that selected at the time of the initial learning, based on the signal from the operation mode judging section 5, like the recognition operation. Although the load distribution is not limited to one of the load distributions of FIGS. 6a–6e, it is preferable to employ a load distribution having a narrower spread than that of the load distribution employed in the initial learning. By doing so, it is possible to learn new judgment criteria while maintaining the state at the time of the initial learning, thereby reducing the amount of calculation required for alteration of the loads during the learning. As a result, it is possible to perform a high-speed learning.

Figure 10:
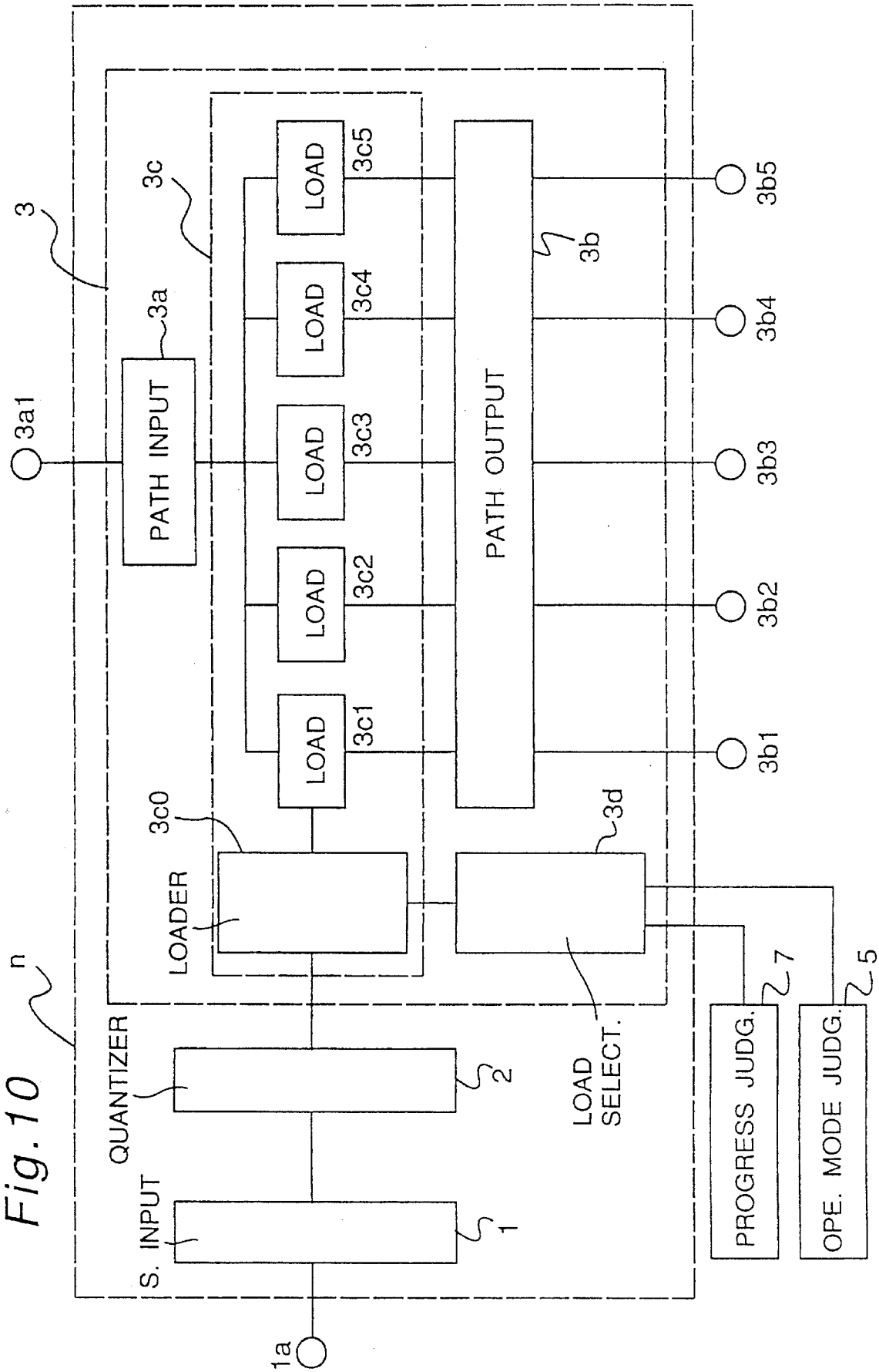
FIG. 10 is a diagram similar to FIG. 5, but indicating a modification of the unit of FIG. 5.

FIG. 10 depicts a modification of the first recognition unit. The recognition unit of FIG. 10 differs from that of FIG. 5 in that the former is provided with a learning progress judgment section 7 so that the load distribution selecting section 3d can select a load distribution based on output information from the operation mode judging section 5 and the learning progress judgment section 7. Although the recognition unit of FIG. 10 is provided with a single path input terminal, it may be provided with a plurality of path input terminals.

When the recognition apparatus of FIG. 9 contains a plurality of recognition units of FIG. 10 at the first and second layers, the learning operation is as follows.

Both the initial learning and the additional learning are basically the same as those of the recognition apparatus containing the recognition units of FIG. 5. The difference is that the learning progress judgment section 7 judges the learning progress in accordance with the rate of correction, the number of alteration of the loads, the magnitude in the amount of error or the like, and sends a signal to the load distribution selecting section whenever the predetermined judgment criteria are satisfied. The load distribution selecting section 3d alters the load distribution when this signal is received thereby. At this moment, the control is performed so as to select a load distribution having a narrower spread than that used up to this time.

As a result, because the judgment criteria are learned to reflect the state established so far and the amount of calculation required to alter the loads can be reduced according to the learning progress, the learning can be completed at a high speed.

As described above, according to the present invention, the connection between the recognition units is determined by the use of a given load distribution, and the load distribution can be selected while the state of learning is being checked. The loads of all connections in the network are not determined by the learning, and the loads of the recognition units other than those of the layer adjacent to the output layer are determined merely by selecting the given load distribution. Because only the loads of the recognition units of the layer adjacent to the output layer are altered upon input of the teacher signal until such recognition units provide respective outputs identical with those intended by the teacher signal, not only the time required for the learning to provide a desired output from unknown input data can be reduced, but also the alteration of the loads can be facilitated. In addition, the alteration of the load distribution in the learning operation and in the recognition operation can enhance the accuracy in recognition.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recognition apparatus having a network organized in a multilayered hierarchical structure comprising:
   a plurality of first recognition units each comprising:
      a first signal input section;
      a first quantizer for performing a quantization according to a signal inputted from said first signal input section; and
      a first path selecting section for performing a selection of paths according to an output from said first quantizer, said first path selecting section comprising;
         a first path input section having only one path input terminal;
         a first path output section having a plurality of first path output terminals for outputting respective output signals;
         a load distribution selecting section for selecting a load distribution;
         a load setting section for changing a strength of connection between said first path input terminal and said plurality of first path output terminals according to the output of said first quantizer by use of the load distribution selected by said load distribution selecting section; and
      wherein said load distribution selected by said load distribution selecting section is centered at a level position determined by the quantization and has a maximum value other than "0" at the level position determined by the quantization, and has another value less than or equal to said maximum value but greater than "0" at a position close to the level position determined by the quantization, and has a value of "0" at other positions;

an operation mode judging section for judging as to whether a learning mode or a recognition mode is selected, wherein said load distribution selecting section is controlled by said operation mode judging section; and a plurality of second recognition units, each of which is connected with at least one of said first recognition units and comprises:

a second path input section having a plurality of second path input terminals for receiving said output signals from said first path output section of said at least one of said first recognition units and an adder for adding signals inputted thereto via said path input terminals; and a path output section having only one path output terminal and a threshold processor for performing a threshold processing with respect to an output signal from said adder;

wherein unless a desired one of said second recognition units provides an output greater than any other of said second recognition units in the learning mode, said operation mode judging section controls said load distribution selecting section to alter the load distribution by adding a first predetermined value to each of current load values.

2. The apparatus according to claim 1 further comprising an operation mode judging section for judging as to whether an initial learning mode or an additional learning mode is selected, wherein said load distribution selecting section is controlled by said operation mode judging section.

3. The apparatus according to claim 2, wherein the load distribution selected in the additional learning mode has a spread narrower than that of the load distribution selected in the initial learning mode.

4. The apparatus according to claim 1 further comprising a learning progress judgment section for judging a learning progress, wherein said load distribution selecting section is controlled by said learning progress judgment section.

5. The apparatus according to claim 4, wherein as the learning advances, the spread of the load distribution becomes narrow.

6. The apparatus according to claim 1, wherein the load distribution selected in the recognition mode has a spread narrower than that of the load distribution selected in the learning mode.

7. A recognition apparatus having a network organized in a multilayered hierarchical structure comprising:

a plurality of first recognition units each comprising:
a first signal input section;
a first quantizer for performing a quantization according to a signal inputted from said first signal input section; and
a first path selecting section for performing a selection of paths according to an output from said first quantizer, said first path selecting section comprising:
a first path input section having only one first path input terminal;
a first path output section having a plurality of first path output terminals for outputting respective output signals;
a load distribution selecting section for selecting a load distribution;
a first load setting section for changing a strength of connection between said first path input terminal and said plurality of first path output terminals according to the output of said first quantizer by use of the load distribution selected by said load distribution selecting section; and
wherein said load distribution selected by said load distribution selecting section is centered at a level position determined by the quantization and has a maximum value other than "0" at the level position determined by the quantization, and has another value less than or equal to said maximum value but greater than "0" at a position close to the level position determined by the quantization, and has a value of "0" at other positions;

a plurality of second recognition units, each of which is connected with at least one of said first recognition units and comprises:
a second signal input section;
a second quantizer for performing a quantization according to a signal inputted from said second signal input section; and
a second path selecting section for performing a selection of paths according to an output from said second quantizer, said second path selecting section comprising:
a second path input section having only one second path input terminal for receiving a respective output signal from a first path output terminal of said first path output section of said at least one of said first recognition units;
a second path output section having a plurality of second path output terminals for outputting respective output signals;
a load calculating section adapted for calculating a load distribution;
a second load setting section for changing a strength of connection between said second path input terminal and said second path output terminal according to the output of said second quantizer by use of an output from said load calculating section; and
wherein said load distribution calculated by said load calculating section is centered at a level position determined by the quantization and has a maximum value other than "0" at the level position determined by the quantization, and has another value less than or equal to said maximum value but greater than "0" at a position close to the level position determined by the quantization, and has a value of "0" at other positions; and a plurality of third recognition units, each of which is connected with at least one of said second recognition units and comprises:
a third path input section having a plurality of third path input terminals for receiving the output signals from said second path output terminals of said second path output section of said at least one of said second recognition units and an adder for adding signals inputted thereto via said third path input terminals; and
a third path output section having only one third path output terminal and a threshold processor for performing a threshold processing with respect to an output signal from said adder.

8. The apparatus according to claim 7 further comprising an operation mode judging section for judging as to whether an initial learning mode or an additional learning mode is selected, wherein said load distribution selecting section is controlled by said operation mode judging section.

9. The apparatus according to claim 8, wherein the load distribution selected in the additional learning mode has a spread narrower than that of the load distribution selected in the initial learning mode.

10. The apparatus according to claim 7 further comprising a learning progress judgment section for judging a learning progress, wherein said load distribution selecting section is controlled by said learning progress judgment section.

11. The apparatus according to claim 10, wherein as the learning advances, the spread of the load distribution becomes narrow.

12. The apparatus according to claim 7 further comprising an operation mode judging section for judging as to whether a learning mode or a recognition mode is selected, wherein said load distribution selecting section is controlled by said operation mode judging section.

13. The apparatus according to claim 12, wherein the load distribution selected in the recognition mode has a spread narrower than that of the load distribution selected in the learning mode.

14. The apparatus according to claim 1, wherein said first predetermined value is obtained by multiplying each of the current load values by a second predetermined value.

15. The apparatus according to claim 12, wherein said load calculating section calculates a new load distribution when a desired one of said third recognition units does not provide an output greater than any other of said third recognition units in the learning mode.

16. The apparatus according to claim 12 further comprising an error judging section for calculating an amount of error between a teacher signal and an output from a network having a plurality of recognition units organized in a multilayered hierarchical structure wherein the load distribution is calculated by said load calculating section according to the amount of error calculated by said error judging section.

* * * * *